United States Patent
Kavali et al.

(10) Patent No.: US 11,893,267 B2
(45) Date of Patent: Feb. 6, 2024

(54) DATA FLOW CONTROL AND ROUTING USING MACHINE LEARNING

(71) Applicant: Bank of America Corporation, Charlotte, NC (US)

(72) Inventors: Rama Venkata S. Kavali, Frisco, TX (US); Venugopala Rao Randhi, Hyderabad (IN); Damodarrao Thakkalapelli, Plano, TX (US); Vijaya Kumar Vegulla, Hyderabad (IN); Rajasekhar Maramreddy, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 17/576,539

(22) Filed: Jan. 14, 2022

(65) Prior Publication Data

US 2023/0229339 A1    Jul. 20, 2023

(51) Int. Cl.
*G06F 3/00* (2006.01)
*G06F 3/06* (2006.01)
*G06N 3/08* (2023.01)

(52) U.S. Cl.
CPC .......... *G06F 3/0655* (2013.01); *G06F 3/0604* (2013.01); *G06F 3/067* (2013.01); *G06N 3/08* (2013.01)

(58) Field of Classification Search
CPC ...... G06F 3/0655; G06F 3/0604; G06F 3/067; G06N 3/08
See application file for complete search history.

(56) References Cited

U.S. PATENT DOCUMENTS

| | | |
|---|---|---|
| 5,261,096 A | 11/1993 | Howarth |
| 5,768,594 A | 6/1998 | Blelloch et al. |
| 6,041,384 A | 3/2000 | Waddington et al. |
| 6,105,029 A | 8/2000 | Maddalozzo, Jr. et al. |
| 6,182,061 B1 | 1/2001 | Matsuzawa et al. |
| 6,192,359 B1 | 2/2001 | Tsuchida et al. |
| 6,351,749 B1 | 2/2002 | Brown et al. |
| 6,457,003 B1 | 9/2002 | Gajda et al. |
| 6,862,593 B2 | 3/2005 | Walters |
| 7,171,419 B2 | 1/2007 | Redpath |

(Continued)

FOREIGN PATENT DOCUMENTS

| | | |
|---|---|---|
| EP | 522683 A2 | 1/1993 |
| EP | 278316 B1 | 12/1994 |

(Continued)

*Primary Examiner* — Craig S Goldschmidt

(57) ABSTRACT

A device configured to identify a first link between a value of a first data element in a first plurality of data elements and values of a first set of data elements in a second plurality of data elements and to remove the first link between the first data element and the first set of data elements. The device is further configured to input the data elements into a machine learning model that is configured to output a second link between the first data element and a second set of data elements. The device is further configured to create an entry in a relationship table that identifies the first data element and the second set of data elements. The device is further configured to generate a data stream with the first data element and the second set of data elements and to output the data stream.

20 Claims, 4 Drawing Sheets

(56) References Cited

U.S. PATENT DOCUMENTS

| | | |
|---|---|---|
| 7,373,348 B2 | 5/2008 | Bell et al. |
| 7,650,331 B1 | 1/2010 | Dean et al. |
| 7,779,429 B2 | 8/2010 | Neil et al. |
| 7,987,287 B2 | 7/2011 | Shorter et al. |
| 8,055,706 B2 | 11/2011 | Koning et al. |
| 8,639,792 B2 | 1/2014 | Tamura |
| 9,940,670 B2 | 4/2018 | Aisen et al. |
| 9,959,572 B2 | 5/2018 | Iannaccone et al. |
| 10,623,478 B2 | 4/2020 | Pitio et al. |
| 10,650,450 B2 | 5/2020 | Aisen et al. |
| 11,575,693 B1 * | 2/2023 | Muddu ................ G06F 40/134 |
| 11,657,024 B2 * | 5/2023 | Srivas ................ G06F 16/178 |
| | | 707/827 |
| 2002/0147815 A1 | 10/2002 | Tormasov et al. |
| 2003/0177240 A1 | 9/2003 | Gulko et al. |
| 2004/0148273 A1 | 7/2004 | Allen et al. |
| 2005/0044067 A1 | 2/2005 | Jameson |
| 2005/0165802 A1 | 7/2005 | Sethi et al. |
| 2007/0234364 A1 | 10/2007 | Lipton et al. |
| 2008/0133617 A1 | 6/2008 | Bali et al. |
| 2009/0157592 A1 | 6/2009 | Dua |
| 2010/0050182 A1 | 2/2010 | Mintz et al. |
| 2010/0186020 A1 | 7/2010 | Maddhirala et al. |
| 2010/0241828 A1 | 9/2010 | Yu et al. |
| 2011/0213802 A1 | 9/2011 | Singh et al. |
| 2012/0134268 A1 | 5/2012 | Lopez et al. |
| 2016/0182330 A1 | 6/2016 | Iannaccone et al. |
| 2016/0205174 A1 | 7/2016 | Pitio et al. |
| 2022/0156226 A1 * | 5/2022 | Wong ....................... G06N 5/01 |

FOREIGN PATENT DOCUMENTS

| | | |
|---|---|---|
| EP | 1631021 A1 | 3/2006 |
| WO | 0029948 A1 | 5/2000 |
| WO | 2007096628 A2 | 8/2007 |

* cited by examiner

DATA FLOW CONTROL AND ROUTING USING MACHINE LEARNING

TECHNICAL FIELD

The present disclosure relates generally to databases, and more specifically to data flow control and routing using machine learning.

BACKGROUND

In a computer network, data records are routinely being processed and transferred between different network devices. A data record often includes data elements that are linked with or associated with other data elements from other data records. In order to successfully process a data element that is linked with other data elements, a network device should obtain all of the associated data elements for processing. In the event that one or more of the data elements is missing, the network device will be unable to process the data. In some instances, this issue may cause erroneous data to be generated and propagated to other downstream network devices. In other instances, the network device may attempt to locate and obtain any missing data elements. In this case, this situation creates a bottleneck that reduces the network device's ability to process data and limits the throughput of the network device. This bottleneck also affects other downstream network devices and limits the throughput and performance of the computer network.

SUMMARY

The disclosed system provides several practical applications and technical advantages that overcome the previously discussed technical problems. The following disclosure provides a practical application of a data ingestion device for an information system. The disclosed data ingestion device provides practical applications that improve the throughput and efficiency of a data processing device and improve the overall performance of a computer network. For example, the disclosed information system provides a practical application by providing a data ingestion process that avoids downtime and bottlenecks that are caused by missing data elements or erroneous data elements during data processing. The data ingestion process also provides a practical application that increases the efficiency and throughput of the information system by allowing data elements to be parsed and grouped together to enable parallel processing within the information system. The data ingestion process generally involves first identifying and removing dependencies between data elements and then generating data streams that allow associated data elements to be grouped together and transmitted without a link between the data elements. In other words, the information system allows groups of data elements that are associated with each other to be identified and transmitted together for processing without any linkage between the data elements. When data elements are linked together, the value of a data element may be directly affected by the value of other data elements. This means that when a data element is linked with another data element that is missing or has an error, the value of the data element cannot be correctly determined. In contrast, the disclosed information system removes the linkage between the data elements such that changes to the value of a data element no longer affect the value of another data element. Through this process, the values of the data elements and the relationships between the data elements are preserved, which allows the data elements to be successfully processed by a network device. This process provides a technical advantage that allows the information system to avoid downtime and bottlenecks that are caused by missing data elements or erroneous data elements during processing. By avoiding downtime and bottlenecks, the information system can avoid situations that would negatively impact the performance and throughput of the network. Thus, the disclosed process improves the operation of the information system overall.

In one embodiment, the information system comprises a data ingestion device that is configured to receive a first data record that comprises a first plurality of data elements and a second data record that comprises a second plurality of data elements. After receiving the data elements, the data ingestion device identifies a first link between a value of a first data element in the first plurality of data elements and values of a first set of data elements in the second plurality of data elements. The first link is configured to allow changes to the values of the first set of data elements to change the value of the first data element. The data ingestion device then removes the first link between the first data element and the first set of data elements. Removing the first link decouples the data elements and disallows changes to the values of the first set of data elements to change the value of the first data element. The data ingestion device may then input the first plurality of data elements and the second plurality of data elements into a machine learning model after removing the first link. The machine learning model is configured to output a second link between the first data element and a second set of data elements in the second plurality of data elements. After identifying the second link, the data ingestion device creates an entry in a relationship table that identifies the first data element and the second set of data elements that are linked with the first date element. The data ingestion device may then generate a data stream comprising the first data element and the second set of data elements and output the data stream for processing.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Information System Overview

Figure 1:
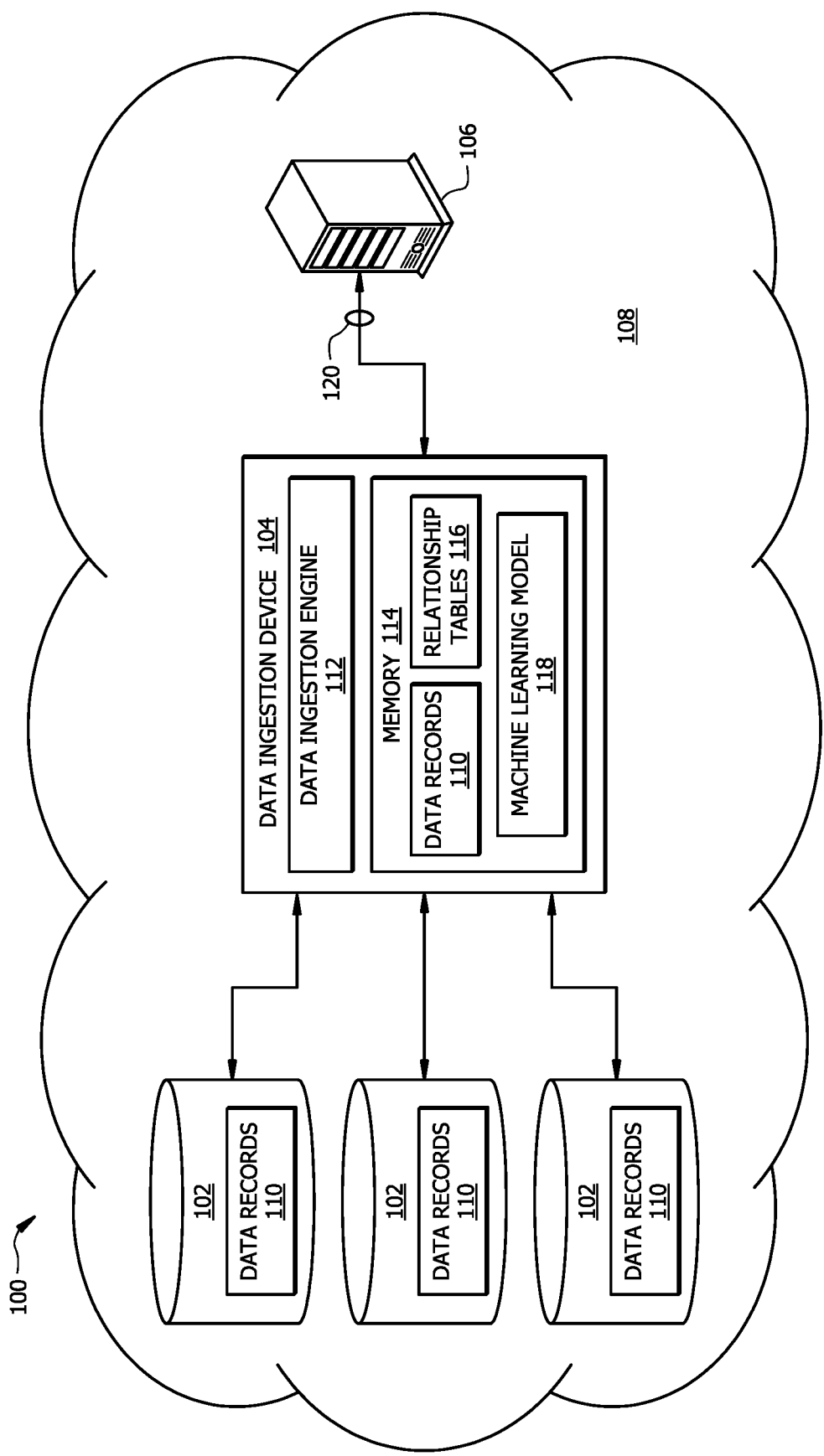
FIG. 1 is a schematic diagram for an information system configured with a data ingestion device.

FIG. 1 is a schematic diagram of an embodiment of an information system 100 that is generally configured to identify dependencies and links among the data elements 302 from one or more data records 110 using a machine learning model 118. This process generally involves identifying data elements 302 with values that are linked to the values of other data elements 302. When a pair of data elements 302 are linked together, this means that changes to the value of one of the data elements 302 will cause a change to the value of the other data element 302. After identifying links between data elements 302, the information system 100 is further configured to record the identified links in a relationship table 116. After recording the links between data elements 302, the information system 100 can then safely remove dependencies by removing the links between the data elements 302. Removing a link for a data element 302 preserves identifiers for other data elements 302 that are linked with the data element 302 but removes the linkage between the data elements 302. By removing the links and dependencies, the information system 100 decouples each data element 302 from other data elements 302 and/or other data records 110. In other words, removing the link between a pair of data elements 302 means that changes to the value of one of the data elements 302 no longer cause a change to the value of the other data element 302. After identifying and removing the links among the data elements 302, the information system 100 is further configured to generate data streams 120 using the previously identified data elements 302 that were linked together and to output the data stream 120 for further processing.

In one embodiment, the information system 100 comprises one or more network devices 102, a data ingestion device 104, and one or more network devices 106 that are in signal communication with each other within a network 108. The network 108 allows communication between and amongst the various components of the information system 100. This disclosure contemplates the network 108 being any suitable network operable to facilitate communication between the components of the information system 100. The network 108 may include any interconnecting system capable of transmitting audio, video, signals, data, messages, or any combination of the preceding. The network 108 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Network Devices

Network devices 102 and 108 are hardware devices that are generally configured to provide hardware and software resources to a user. Examples of network devices 102 and 108 include, but are not limited to, a computer, a server, a database, a smartphone, a tablet, a laptop, a smart device, or any other suitable type of device. For example, network devices 102 may be databases and network device 106 may be a server or computer. In other examples, the network devices 102 and 108 may be any other suitable type or combination of devices.

Figure 3:
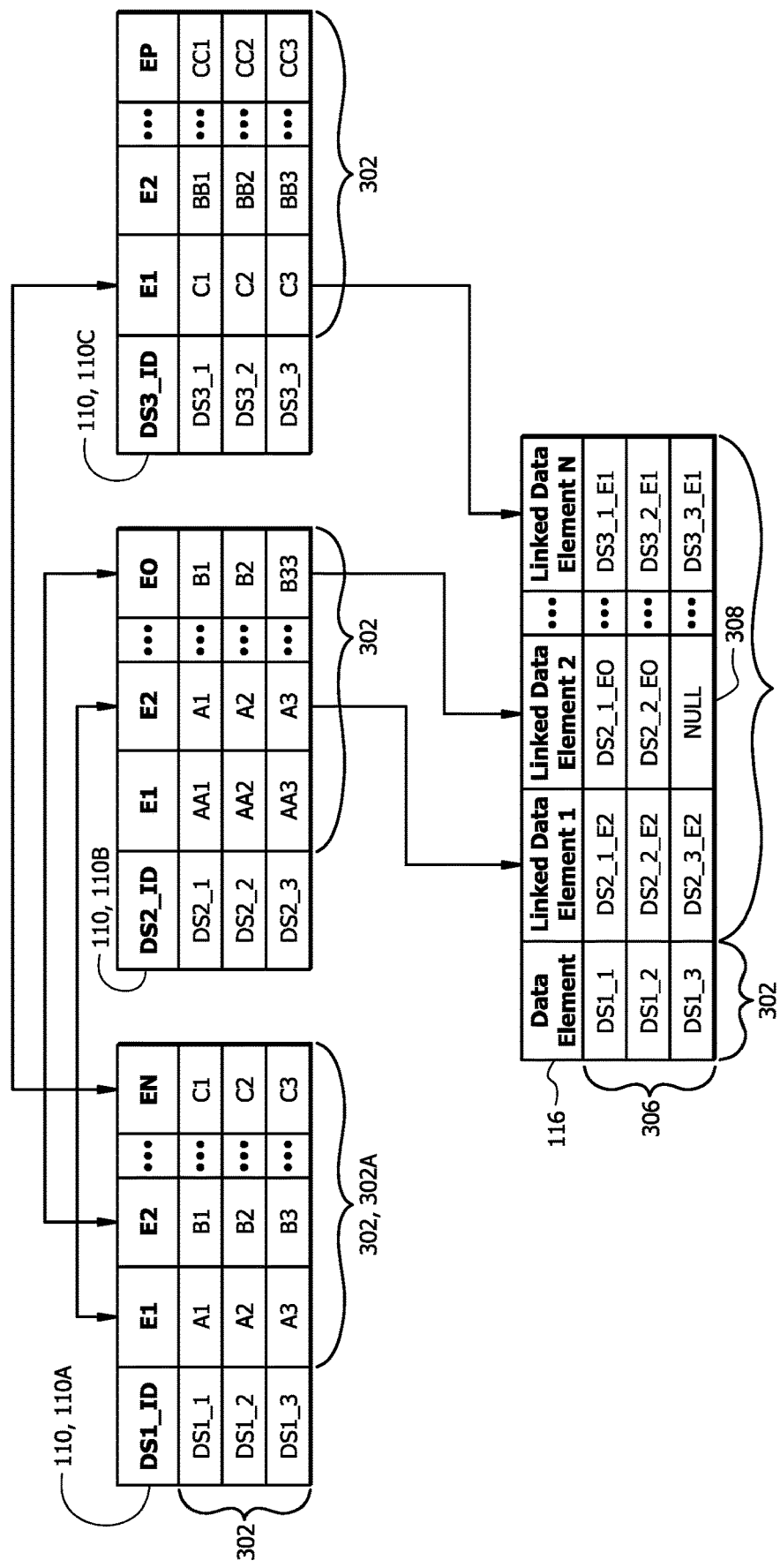
FIG. 3 is an example of a mapping between data records and a relationship table.

Network devices 102 are each configured to store data records 110. Examples of data records 110 include, but are not limited to, data tables, spreadsheets, database files, text files, or any other suitable type of data file. As an example, each network device 102 may be configured to store data records 110 that correspond with different types of account information for a plurality of users. Each data record 110 comprises a plurality of data elements 302. For example, a data record 110 may be a data table. In this example, the data elements 302 correspond with the cells or fields of the data table and their respective values. An example of data records 110 is shown in FIG. 3. Each network device 102 is further configured to send data records 110 to the data ingestion device 104 for processing.

Network device 106 is configured to receive a data stream 120 from the data ingestion device 104 and to process the data stream 120. The data stream 120 comprises data elements 302 from one or more data records 110. For example, the network device 106 may be configured to perform computations using the data elements 302 from a data stream 120. As another example, the network device 106 may be configured to populate an information request based on the data elements 302 from a data stream 120. In other examples, the network device 106 may be configured to perform any other suitable type of operation based on the data elements 302 within a data stream 120.

Data Ingestion Device

Examples of a data ingestion device 104 include, but are not limited to, an access point, a server, a computer, or any other suitable type of network device. In one embodiment, a data ingestion device 104 comprises a data ingestion engine 112 and a memory 114. Additional details about the hardware configuration of the data ingestion device 104 are described in FIG. 4. The memory 114 is configured to store data records 110, relationship tables 116, machine learning models 118, and/or any other suitable type of data. In FIG. 1, the data ingestion device 104 is shown as a separate device from the network device 106. In some embodiments, the functionality of the data ingestion device 104 may be integrated within the network device 106. In this configuration, the data ingestion device 104 and the network device 106 may be integrated within the same device.

In one embodiment, the data ingestion engine 112 is generally configured to receive data records 110 from one or more network devices 102 and to identify dependencies among the data records 110. This process generally involves using a combination of information from the data records 110 and a machine learning model 118 to identify any dependencies among the data elements 302 of the data records 110. After identifying any dependencies among the data elements 302 of the data records 110, the data ingestion device 104 is further configured to generate a relationship table 116 that identifies the dependencies among the data elements 302 of the data records 110. The data ingestion device 104 is further configured to generate data streams 120 using the data elements 302 from the data records 110 based on the information in the relationship table 116. This process generally involves identifying data elements 302 and their dependencies with other data elements 302 to generate a data stream 120. After generating a data stream 120, the data ingestion device 104 is further configured to send the data stream 120 to the network device 106 for further processing. An example of the data ingestion device 104 performing these operations is described in FIG. 2.

Examples of machine learning models 118 include, but are not limited to, a multi-layer perceptron, a recurrent neural network (RNN), an RNN long short-term memory (LSTM), a convolutional neural network (CNN), regression models (e.g. non-linear least squares regression models) or any other suitable type of neural network model. Additional details about the machine learning model 118 are described in FIG. 2. In one embodiment, a machine learning model 118 is generally configured to receive a plurality of data elements 302 from one or more data records 110 as an input.

The machine learning model 118 is further configured to output a set of dependencies or links among the data elements 302 based on the provided input.

The machine learning model 118 is trained using supervised or unsupervised learning training data that comprises data elements 302 with different types of dependencies or links. During the training process, the machine learning model 118 determines weights and bias values that allow the machine learning model 118 to identify dependencies between data elements 302. The data ingestion engine 112 may be configured to train the machine learning models 118 using any suitable technique as would be appreciated by one of ordinary skill in the art. In some embodiments, the machine learning model 118 may be stored and/or trained by a device that is external from the data ingestion device 104.

An example of a relationship table 116 is shown in FIG. 3. A relationship table 116 generally comprises information about dependencies among a plurality of data elements 302 from one or more data records 110. For example, a relationship table 116 may identify a plurality of data elements 302 from a first data record 110 that are linked with other data elements 302 in a second data record 110. A dependency or link between data elements 302 indicates that the value of one data element 302 is affected by the value of one or more other data elements 302. In other words, a link between a pair of data elements means that a change in the value of one of the data elements 302 will cause a change to the value of the other data element 302. As an example, a first data element 302 may have a first value, a second data element 302 may have a second value, and a third data element 302 may have a value that is equal to the sum of the first value of the first data element 302 and the second value of the second data element 302. In this example, the third data element 302 has a dependency or link with the first data element 302 and the second data element 302. In other words, the value of the third data element 302 depends on the first value of the first data element 302 and the second value of the second data element 302. In this case, the relationship table 116 would include dependency information that links the third data element 302 with the first data element 302 and the second data element 302.

Data Ingestion Process

Figure 2:
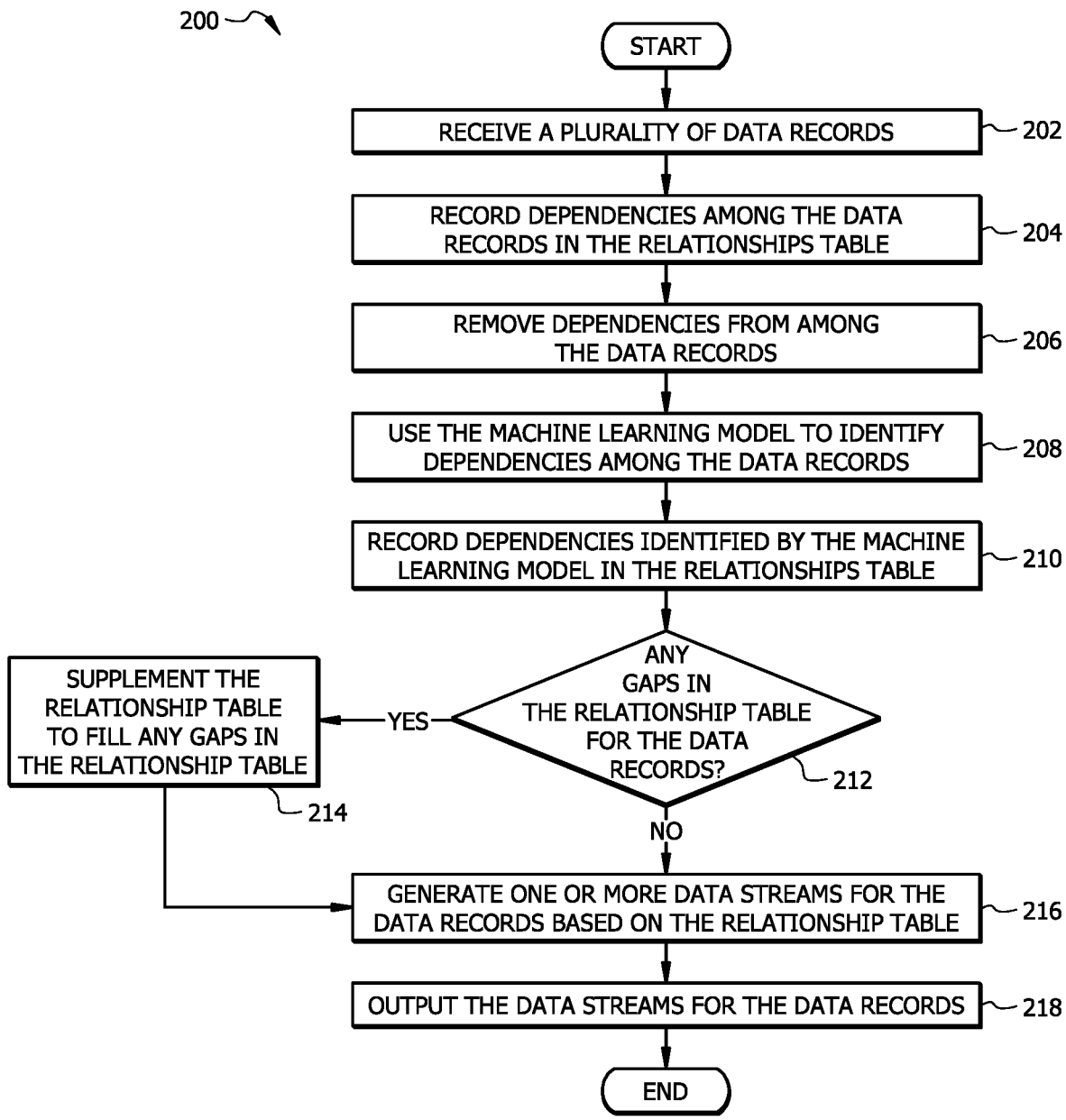
FIG. 2 is a flowchart of an embodiment of a data ingestion process for the information system.

FIG. 2 is a flowchart of an embodiment of a data ingestion process 200 for the information system 100. The information system 100 may employ process 200 to identify dependencies and links among the data elements 302 of one or more data records 110 using a machine learning model 118. After identifying links among the data elements 302, the information system 100 may also employ process 200 to generate data streams 120 using the identified linked data elements 302 and to output the data stream 120 for further processing.

At operation 202, the data ingestion device 104 receives a plurality of data records 110. Referring to FIG. 3 as an example, the data ingestion device 104 receive a first data record 110A comprising a first plurality of data elements 302 from a first network device 102, a second data record 110B comprising a second plurality of data elements 302 from a second network device 102, a third data record 110C comprising a third plurality of data elements 302 from a third network device 102, and so on. In this example, each data record 110 may be associated with a different type of account information for a plurality of users. For instance, the first data record 110A may be associated with user profile account information for a plurality of users. The second data record 110B may be associated with financial account information for the users. The third data record 110C may be associated with network information for the users. In other examples, the data records 110 may be associated with any other suitable type of information for the users. In the example shown in FIG. 3, the first data record 110A comprises data elements 302 that are linked with other data elements 304 from the second data record 110B and the third data record 110C.

In one embodiment, the data ingestion device 104 is configured to periodically receive data records 110 from one or more network devices 102. In this case, the data ingestion device 104 may receive data records 110 every thirty minutes, hourly, daily, or at any other suitable time interval. In some cases, the data ingestion device 104 may be configured to receive data records 110 asynchronously. For example, the network devices 102 may be configured to send a data record 110 when the data record 110 becomes available or when the data record 110 is updated. In other embodiments, the data ingestion device 104 may be configured to send requests to the network devices 102 for data records 110. In this case, the data ingestion device 104 may send a request to a network device 102 that identifies a requested data record 110. In response to sending the request, the data ingestion device 104 receives the requested data record 110 from the network device 102. In some embodiments, the data ingestion device 104 is configured to generate and store a copy of each received data record 110. This process allows the data ingestion device 104 to provide data integrity in the event that a data record 110 becomes corrupt while processing the data record 110.

Returning to FIG. 2 at operation 204, the data ingestion device 104 records dependencies among the data records 110 in the relationship table 116. Here, the data ingestion device 104 analyzes the data records 110 to identify any data elements 302 with values that are linked with the values of other data elements 302. A link between two data elements 302 indicates a dependency between the two data elements 302. In other words, the link allows changes to the value of one of the data elements 302 to cause a change to the value of the other data element 302. The data ingestion device 104 first identifies any data elements 302 that include a reference or link to another data element 302. For example, the data ingestion device 104 may identify a data element 302 that includes a reference (e.g. a data element identifier), an equation, or a formula that refers to or is linked with one or more other data elements 302. In this example, the data ingestion device 104 identifies the data element 302 that is linked to other data elements 302 as well as the other data elements 302 that it is linked with. Returning to the example in FIG. 3, the data ingestion device 104 may analyze the first data record 110A to identify any data elements 302 that are linked with other data elements 302 from the second data record 110B or the third data record 110C. In this example, each data element 302 (shown as DS1_1, DS1_2, and DS1_3) is linked with data element 302A values (shown as A1, A2, A3, B1, B2, B3, C1, C2, and C3) from the second data record 110B and the third data record 110C. For example, a first data element 302 (shown as DS1_1) is linked with the value of A1 and B1 from the second data record 110B and the value of C1 from the third data record 110C. Similarly, the other data elements 302 (e.g. DS1_2 and DS1_3) are also linked with values from the second data record 110B and the third data record 110C. In this example, the data ingestion device 104 identifies each data element 302 from the first data record 110A that is linked with other data elements 302A from the second data record 110B and the third data record 110C. The data ingestion device 104 repeats this same process to identify links among the data elements 302 of the second data record 110B and the third data record 110C.

After identifying data elements 302 that are linked together, the data ingestion device 104 then records the identified data elements 302 as entries 306 in the relationship table 116. Referring again to the example in FIG. 3, the data ingestion device 104 adds an entry 306 to the relationship table 116 that identifies a data element 302 and any other data elements 302A that are linked with the data element 302. For example, the data ingestion device 104 creates an entry for a first data element 302 (e.g. DS1_1) from the first data record 110A. In this entry 306, the data ingestion device 104 also identifies the other data elements 302A (e.g. DS2_1_E2, DS2_1_EO, and DS3_1_E1) that are linked with the first data element 302. The data ingestion device 104 repeats this process to create entries 306 in the relationship table 116 for any other data elements 302 among the data records 110.

Returning to FIG. 2 at operation 206, the data ingestion device 104 removes dependencies from among the data records 110. When a data element 302 contains a reference that refers to other data elements 302, the reference may comprise links or hyperlinks to one or more other data elements 302. After the data ingestion device 104 identifies and records a dependency for a data element 302, the data ingestion device 104 can then safely remove dependencies by removing any links from the reference for the data element 302. In some embodiments, removing a link from a reference for a data element 302 preserves identifiers for other data elements 302 that are linked with the data element 302 but removes the linkage between the data elements 302. By removing the links and dependencies, the data ingestion device 104 decouples each data element 302 from other data elements 302 and/or other data records 110. In other words, removing a link between a pair of data elements 302 means that changes to the value of one of the data elements 302 no longer cause a change to the value of the other data element 302.

At operation 208, the data ingestion device 104 uses the machine learning model 118 to identify dependencies among the data records 110. After removing the dependencies from the data records 110, the data ingestion device 104 inputs data elements 302 from one or more data records 110 into the machine learning model 118. As an example, the data ingestion device 104 may input the data elements 302 from a data record 110 into the machine learning model 118 to determine whether there are any dependencies or links among the data elements 302 of the data record 110. As another example, the data ingestion device 104 may input the data elements 302 from a first data record 110 and the data elements 302 from a second data record 110 into the machine learning model 118 to determine whether there are any dependencies between the data elements 302 of the first data record 110 and the second data record 110. In other examples, the data ingestion device 104 may input the data elements 302 from any suitable number of data records 110 into the machine learning model 118 to determine whether there are any dependencies among the data elements 302 of the data records 110. In response to inputting the data elements 302 into the machine learning model 118, the machine learning model 118 outputs a set of dependencies. Each dependency identifies data elements 302 with values that are linked to the value of the other data elements 302 from among the data records 110. The machine learning model 118 may output dependencies that are the same or different from the dependencies identified in operation 204.

The data ingestion device 104 may input the data elements 302 from each data record 110 into the machine learning model 118 in parallel or series. For example, the data ingestion device 104 may input the data elements 302 in series by concatenating the data elements 302 from each data record 110 to generate a single string of data elements 302 that are input into the machine learning model 118. As another example, the data ingestion device 104 may input the data elements 302 in parallel by inputting data elements 302 from more than one data record 110 into the machine learning model 118 at the same time.

At operation 210, the data ingestion device 104 records any dependencies that are identified by the machine learning model 118 into the relationship table 116. Here, the data ingestion device 104 adds entries 306 to the relationship table 116 for any dependencies that were identified by the machine learning model 118. Each entry 306 identifies a data element 302 and the other data elements 302A that are linked with the data element 302.

At operation 212, the data ingestion device 104 determines whether there are any gaps 308 in the relationship table 116 for the data records 110. A gap 308 in the relationship table 116 corresponds with a missing dependency for a data element 302. In some instances, a gap 308 in the relationship table 116 may occur when data ingestion device 104 is unable to identify a data element 302 among the data records 110 that is linked with another data element 302. In other instances, a gap 308 in the relationship table 116 may occur when a data element 302 is linked with an invalid data element 302 or a data element 302 with an invalid value. If a gap 308 in the relationship table 116 is not corrected, the gap 308 will result in the data ingestion device 104 generating a data stream 120 that does not contain all of the necessary data elements 302 for processing. This situation may result in an error if the data stream 120 is used by downstream devices (e.g. network device 106) as-is. Returning to the example in FIG. 3 as an example, a gap 308 in the relationship table 116 is represented by a null value. In this example, the data ingestion device 104 identifies any data elements 302 that are associated with a null value in the relationship table 116. In other examples, a gap 308 in the relationship table 116 may be represented using any other suitable value. Returning to FIG. 2 at operation 212, the data ingestion device 104 proceeds to operation 214 in response to determining that there are one or more gaps 308 in the relationship table 116. In this case, the data ingestion device 104 proceeds to operation 214 to obtain additional information to fill in any gaps 308 in the relationship table 116.

At operation 214, the data ingestion device 104 supplements the relationship table 116 to fill any gaps 308 in the relationship table 116. In one embodiment, the data ingestion device 104 supplements the relationship table 116 by requesting information from a user. For example, the data ingestion device 104 may send a request to a user for a user input to correct a missing dependency. In this example, the request may identify a data element 302 with a missing dependency and any other information associated with the data element 302. For instance, the request may identify the data record 110 where the data element 302 is located and any other data elements 302 that are linked with the data element 302. In response to sending the request, the data ingestion device 104 receives a user input that identifies one or more other data elements 302 that are linked with the data element 302 in the request. The data ingestion device 104 uses the information from the user input to fill in gaps 308 or missing dependencies for the data element in the relationship table 116.

In some embodiments, the data ingestion device 104 may supplement the relationship table 116 using historical information. In this case, the data ingestion device 104 may use previously stored information associated with a data element 302 or data record 110 to fill in any gaps 308 or missing dependencies. For example, the data ingestion device 104 may identify a previous version of a data record 110 or a previously received data record 110 that contains a data element 302 with a missing dependency. In this example, the data ingestion device 104 uses the previous data record 110 to identify one or more data elements 302 that are linked with the data element 302 with the missing dependency. The data ingestion device 104 may use a process similar to the process described in operations 204 or 208 to identify any missing dependencies for a data element 302. In other embodiments, the data ingestion device 104 may supplement the relationship table 116 using information from any other suitable type of source or combination of data sources.

Returning to operation 212, the data ingestion device 104 proceeds to operation 216 in response to determining that there are no gaps 308 in the relationship table 116 for the data records 110. In this case, the data ingestion device 104 proceeds to operation 216 to begin generating data streams 120 using the data elements 302 from the received data records 110. At operation 216, the data ingestion device 104 generates one or more data streams 120 for the data records 110 based on the relationship table 116. In one embodiment, the data ingestion device 104 generates a data stream 120 by first identifying a data element 302 and then identifying any other data elements 302 that are linked with the identified data element 302 in the relationship table 116. The data ingestion device 104 then concatenates the data element 302 with the other data elements 302 that are linked with the data element 302 to form a data stream 120. By combining the data element 302 with other data elements 302 that the data element 302 depends on, the data ingestion device 104 is able to generate a data stream 120 that contains all of the necessary information to process the data element 302. The data ingestion device 104 repeats this process by iteratively identifying another data element 302 and any other data elements 302 that are linked with the identified data element 302 in the relationship table 116.

At operation 218, the data ingestion device 104 outputs the data streams 120 for the data records 110. After generating a data stream 120, the data ingestion device 104 outputs the generated data stream 120 to a downstream network device 106 for further processing. The network device 106 may perform computations using the data elements 302 from a data stream 120, populate an information request based on the data elements 302 from a data stream 120, or perform any other suitable type of operation based on the data elements 302 within a data stream 120. In some embodiments, the data ingestion device 104 may additionally, or alternatively, perform computations using the data elements 302 from the data stream 120, populate an information request based on the data elements 302 from the data stream 120, or perform any other suitable type of operation based on the data elements 302 within the data stream 120

Hardware Configuration for the Data Ingestion Device

Figure 4:
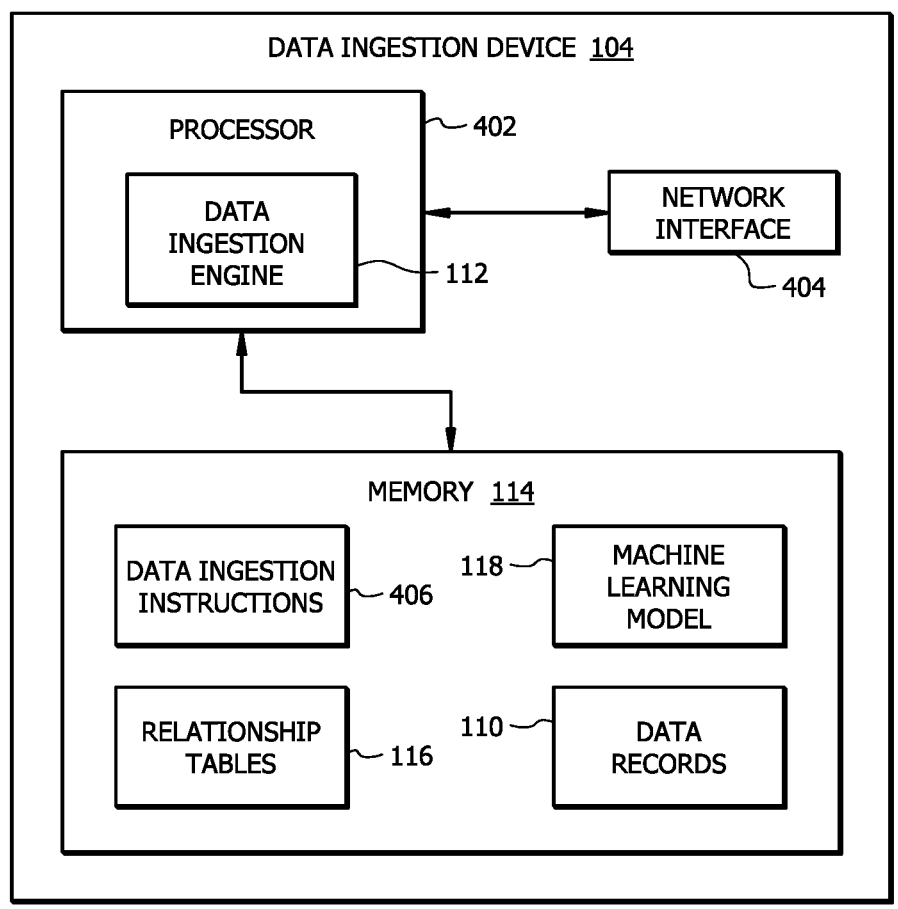
FIG. 4 is an embodiment of a data ingestion device for the information system.

FIG. 4 is an embodiment of a data ingestion device 104 for the information system 100. As an example, the data ingestion device 104 may be a server, an access point, or a computer. The data ingestion device 104 comprises a processor 402, a memory 114, and a network interface 404. The data ingestion device 104 may be configured as shown or in any other suitable configuration.

Processor

The processor 402 is a hardware device that comprises one or more processors operably coupled to the memory 114. The processor 402 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 114 and the network interface 404. The one or more processors are configured to process data and may be implemented in hardware or software. For example, the processor 402 may be 8-bit, 16-bit, 32-bit, 64-bit, or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute data ingestion instructions 406 to implement the data ingestion engine 112. In this way, processor 402 may be a special-purpose computer designed to implement the functions disclosed herein. In an embodiment, the data ingestion engine 112 is implemented using logic units, FPGAs, ASICs, DSPs, or any other suitable hardware. The data ingestion engine 112 is configured to operate as described in FIGS. 1 and 2. For example, the data ingestion engine 112 may be configured to perform the operations of process 200 as described in FIG. 2.

Memory

The memory 114 is a hardware device that is operable to store any of the information described above with respect to FIGS. 1 and 2 along with any other data, instructions, logic, rules, or code operable to implement the function(s) described herein when executed by the processor 402. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store data ingestion instructions 406, data records 110, relationship tables 116, machine learning models 118, and/or any other data or instructions. The data ingestion instructions 406 may comprise any suitable set of instructions, logic, rules, or code operable to execute the data ingestion engine 112. The data records 110, the relationship tables 116, and the machine learning models 118 are configured similar to the data records 110, the relationship tables 116, and the machine learning models 118 described in FIGS. 1 and 2, respectively.

Network Interface

The network interface 404 is a hardware device that is configured to enable wired and/or wireless communications. The network interface 404 is configured to communicate data between network devices 102, network devices 106, and other devices, systems, or domains. For example, the network interface 404 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A data ingestion device, comprising:
a memory operable to store a relationship table, wherein:
the relationship identifies a plurality of data elements; and
a value for each data element is linked with a value for one or more other data elements; and
a processor operably coupled to the memory, configured to:
receive a first data record comprising a first plurality of data elements;
receive a second data record comprising a second plurality of data elements;
identify a first link between a value of a first data element in the first plurality of data elements and values of a first set of data elements in the second plurality of data elements, wherein the first link allows changes to the values of the first set of data elements to change the value of the first data element;
remove the first link between the first data element and the first set of data elements, wherein removing the first link disallows changes to the values of the first set of data elements to change the value of the first data element;
input the first plurality of data elements and the second plurality of data elements into a machine learning model after removing the first link, wherein the machine learning model is configured to:
receive the first plurality of data elements and the second plurality of data elements; and
output a second link between the first data element and a second set of data elements in the second plurality of data elements, wherein the second link allows changes to the values of the second set of data elements to change the value of the first data element;
create a first entry in the relationship table, wherein the first entry identifies:
the first data element; and
the second set of data elements;
generate a data stream comprising the first data element and the second set of data elements; and
output the data stream.

2. The device of claim 1, wherein the first set of data elements is different from the second set of data elements.

3. The device of claim 1, wherein the processor is further configured to create a second entry in the relationship table, wherein the second entry identifies:
the first data element; and
the first set of data elements that are linked with the first data element.

4. The device of claim 3, wherein the processor is further configured to:
generate a second data stream comprising the first data element and the first set of data elements; and
output the second data stream.

5. The device of claim 1, wherein the processor is further configured to input the first plurality of data elements and the second plurality of data elements into the machine learning model in parallel.

6. The device of claim 1, wherein outputting the data stream comprises sending the data stream to a downstream network device.

7. The device of claim 1, wherein:
the first data record is received from a first network device; and
the second data record is received from a second network device that is different from the first network device.

8. A data ingestion method, comprising:
receiving a first data record comprising a first plurality of data elements;
receiving a second data record comprising a second plurality of data elements;
identifying a first link between a value of a first data element in the first plurality of data elements and values of a first set of data elements in the second plurality of data elements, wherein the first link allows changes to the values of the first set of data elements to change the value of the first data element;
removing the first link between the first data element and the first set of data elements, wherein removing the first link disallows changes to the values of the first set of data elements to change the value of the first data element;
inputting the first plurality of data elements and the second plurality of data elements into a machine learning model after removing the first link, wherein the machine learning model is configured to:
receive the first plurality of data elements and the second plurality of data elements; and
output a second link between the first data element and a second set of data elements in the second plurality of data elements, wherein the second link allows changes to the values of the second set of data elements to change the value of the first data element;

creating a first entry in a relationship table, wherein the first entry identifies:
the first data element; and
the second set of data elements;

generating a data stream comprising the first data element and the second set of data elements; and outputting the data stream.

9. The method of claim 8, wherein the first set of data elements is different from the second set of data elements.

10. The method of claim 8, further comprising creating a second entry in the relationship table, wherein the second entry identifies:
the first data element; and
the first set of data elements that are linked with the first data element.

11. The method of claim 10, further comprising:
generating a second data stream comprising the first data element and the first set of data elements; and
outputting the second data stream.

12. The method of claim 8, further comprising inputting the first plurality of data elements and the second plurality of data elements into the machine learning model in parallel.

13. The method of claim 8, wherein outputting the data stream comprises sending the data stream to a downstream network device.

14. The method of claim 8, wherein:
the first data record is received from a first network device; and
the second data record is received from a second network device that is different from the first network device.

15. A computer program product comprising executable instructions stored in a non-transitory computer-readable medium that when executed by a processor causes the processor to:
receive a first data record comprising a first plurality of data elements;
receive a second data record comprising a second plurality of data elements;
identify a first link between a value of a first data element in the first plurality of data elements and values of a first set of data elements in the second plurality of data elements, wherein the first link allows changes to the values of the first set of data elements to change the value of the first data element;
remove the first link between the first data element and the first set of data elements, wherein removing the first link disallows changes to the values of the first set of data elements to change the value of the first data element;
input the first plurality of data elements and the second plurality of data elements into a machine learning model after removing the first link, wherein the machine learning model is configured to:
receive the first plurality of data elements and the second plurality of data elements; and
output a second link between the first data element and a second set of data elements in the second plurality of data elements, wherein the second link allows changes to the values of the second set of data elements to change the value of the first data element;
create a first entry in a relationship table, wherein the first entry identifies:
the first data element; and
the second set of data elements;
generate a data stream comprising the first data element and the second set of data elements; and
output the data stream.

16. The computer program product of claim 15, wherein the first set of data elements is different from the second set of data elements.

17. The computer program product of claim 15, further comprising instructions that when executed by the processor causes the processor to create a second entry in the relationship table, wherein the second entry identifies:
the first data element; and
the first set of data elements that are linked with the first data element.

18. The computer program product of claim 17, further comprising instructions that when executed by the processor causes the processor to:
generate a second data stream comprising the first data element and the first set of data elements; and
output the second data stream.

19. The computer program product of claim 15, further comprising instructions that when executed by the processor causes the processor to input the first plurality of data elements and the second plurality of data elements into the machine learning model in parallel.

20. The computer program product of claim 15, wherein outputting the data stream comprises sending the data stream to a downstream network device.

* * * * *

UNITED STATES PATENT AND TRADEMARK OFFICE
CERTIFICATE OF CORRECTION

| | | |
|---|---|---|
| PATENT NO. | : 11,893,267 B2 | Page 1 of 1 |
| APPLICATION NO. | : 17/576539 | |
| DATED | : February 6, 2024 | |
| INVENTOR(S) | : Kavali et al. | |

It is certified that error appears in the above-identified patent and that said Letters Patent is hereby corrected as shown below:

On the Title Page

Under Inventors Item (72) Line 6, please delete, "Rajasekhar Maramreddy" and please insert -- Rajasekhara Maramreddy --, therefor.

Signed and Sealed this
Twenty-second Day of April, 2025

Coke Morgan Stewart
*Acting Director of the United States Patent and Trademark Office*